United States Patent
Allier et al.

(10) Patent No.: US 10,908,060 B2
(45) Date of Patent: Feb. 2, 2021

(54) METHOD FOR DETERMINING PARAMETERS OF A PARTICLE

(71) Applicant: Commissariat A L'Energie Atomique et aux Energies Alternatives, Paris (FR)

(72) Inventors: Cedric Allier, Grenoble (FR); Lionel Herve, Grenoble (FR); Pierre Joly, Grenoble (FR)

(73) Assignee: Commissariat A L'Energie Atomique et aux Energies Alternatives, Paris (FR)

( * ) Notice: Subject to any disclaimer, the term of this patent is extended or adjusted under 35 U.S.C. 154(b) by 0 days.

(21) Appl. No.: 16/595,661

(22) Filed: Oct. 8, 2019

(65) Prior Publication Data

US 2020/0110017 A1    Apr. 9, 2020

(30) Foreign Application Priority Data

Oct. 9, 2018 (FR) ...................... 18 59362

(51) Int. Cl.
*G01N 15/02* (2006.01)
*G01N 15/00* (2006.01)

(52) U.S. Cl.
CPC ..... *G01N 15/0227* (2013.01); *G01N 15/0211* (2013.01); *G01N 2015/0238* (2013.01); *G01N 2015/035* (2013.01)

(58) Field of Classification Search
CPC ........... G01N 15/0227; G01N 15/0211; G01N 2015/0238; G01N 2015/035;
(Continued)

(56) References Cited

U.S. PATENT DOCUMENTS

2012/0218379 A1* 8/2012 Ozcan .................. G03H 1/0866
                                                                                    348/40
2012/0294136 A1* 11/2012 Sato ..................... G03H 1/0443
                                                                                    369/112.15
(Continued)

FOREIGN PATENT DOCUMENTS

WO    WO 2017/178723 A1    10/2017

OTHER PUBLICATIONS

French Preliminary Search Report dated Apr. 18, 2019 in French Application 18 59362 filed on Oct. 9, 2018 (with English Translation of Categories of Cited Documents & Written Opinion).
(Continued)

*Primary Examiner* — Jonathan M Hansen
(74) *Attorney, Agent, or Firm* — Oblon, McClelland, Maier & Neustadt, L.L.P.

(57) ABSTRACT

A method for determining a parameter of a particle present in a sample, the method comprising the following steps:
  a) illuminating the sample with the light source, the light source emitting an incident light wave that propagates along a propagation axis;
  b) acquiring an image of the sample with the image sensor, the image sensor being exposed to an exposure light wave;
  c) determining a position of the particle in the detection plane;
  d) on the basis of the acquired image, applying a propagation operator, for a plurality of distances from a detection plane, so as to estimate, at each distance, a complex amplitude of the exposure light wave;
  e) on the basis of the complex amplitude estimated, at various distances, obtaining a profile representing a variation of the complex amplitude of the exposure light wave along an axis parallel to the propagation axis and passing through the position of the particle.
(Continued)

The particle may associated with a set of parameters, comprising at least a size of the particle and a refractive index of the particle.

17 Claims, 9 Drawing Sheets

(58) Field of Classification Search
CPC ....... G01N 15/1463; G01N 2015/1454; G01N 21/4795; G03H 1/0866; G03H 1/0443
See application file for complete search history.

(56) References Cited

U.S. PATENT DOCUMENTS

| | | |
|---|---|---|
| 2014/0333935 A1 | 11/2014 | Grier et al. |
| 2019/0101482 A1 | 4/2019 | Allier et al. |
| 2020/0124586 A1* | 4/2020 | Herve ................. G03H 1/0443 |

OTHER PUBLICATIONS

Olivier, T., et al., "Optimizing phase object reconstruction using an in-line digital holographic microscope and a reconstruction based on a Lorenz-Mie model", Proceedings of SPIE, vol. 10677, 2018, 11 pages.

Vandewiele, S, et al., "Low coherence digital holography microscopy based on the Lorenz-Mie scattering model", Optics Express, vol. 25, No. 21, 2017, 14 pages.

Anand, A, et al., "Automatic Identification of Malaria-Infected RBC With Digital Holographic Microscopy Using Correlation Algorithms", IEEE Photonics Journal, vol. 4, No. 5, 2012, 10 pages.

* cited by examiner

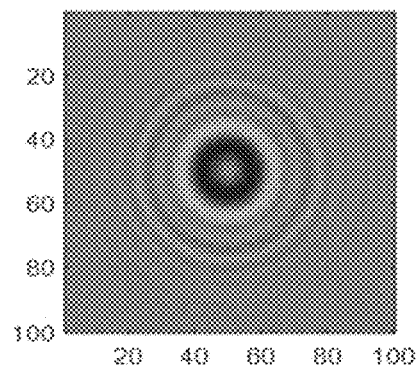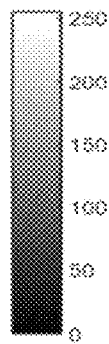
Fig. 2A
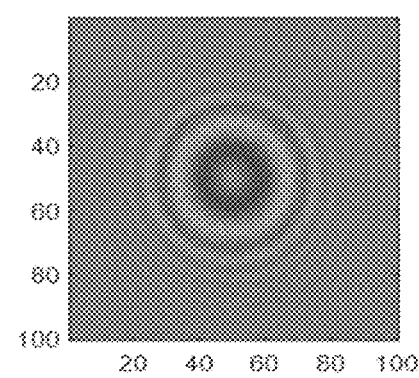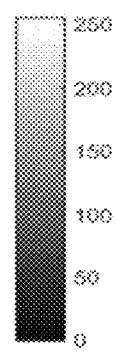
Fig. 2B
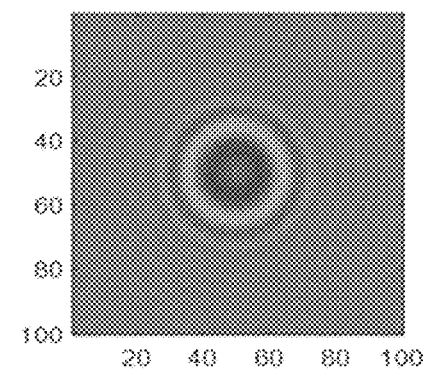
Fig. 2C
Fig. 2D
Fig. 2E
Fig. 2F

METHOD FOR DETERMINING PARAMETERS OF A PARTICLE

TECHNICAL FIELD

The technical field of the invention is the characterization of particles, for example biological particles, on the basis of an image.

PRIOR ART

Holographic imaging has seen, since a number of years, substantial developments, in particular in the field of analysis of samples. A high number of applications have been described, for characterizing samples, in particular samples intended for applications in biology or for diagnostics. Many publications for example relate to samples comprising particles, the objective being to characterize the particles.

Conventionally, an image of a sample, designated by the term hologram, is formed and a holographic propagation operator is applied to the image. The image of the sample may be acquired in a so-called defocused configuration, as described in document WO2016/097092. In this document, a method for imaging in a defocused configuration is described, for identifying a microorganism, on the basis of an image of a sample, said image being acquired by an image sensor that is offset with respect to a focal plane of the optical system, a holographic propagation operator then being applied to the defocused image.

In another configuration, the image of the sample may be acquired in a lensless imaging configuration, no image-forming optic being placed between the sample and the image sensor. Document WO2016/151249 describes a method for analyzing cells, placed in a culture medium, without labelling. Document WO2016/151248 describes a method for identifying particles, blood particles for example. The methods described in these documents are based on the establishment of a profile, representing a variation, along an optical axis, of a characteristic quantity of an exposure light wave, to which the image sensor is exposed. Generally, with each particle of the sample is associated one profile. The particle is characterized by comparing the profile to standard profiles, the latter being obtained experimentally, employing samples the particles of which have known characteristics.

The aforementioned documents are based on an analogy between a profile established by applying a holographic reconstruction operator to a sample image, and a series of experimentally obtained standard profiles. In order to obtain a holographic reconstruction of good quality, the image of the sample may be subjected to an iterative reconstruction algorithm. Iterative reconstruction algorithms are for example described in WO2016189257 or in WO2017162985. The methods described above assume that the profiles measured on the basis of the sample and the standard profiles are preferably established using the same holographic reconstruction algorithm. In addition, it is preferable, though not absolutely necessary, for the standard profiles to be obtained under experimental conditions that are as close as possible to the conditions under which the image of the sample is formed. The experimental conditions are for example the type of light source, the type of sensor, the size of the pixels, the distance between the sensor and the sample.

The inventors have sought to perfect the methods described above, so as to be less bound to the experimental conditions and algorithm employed to establish the standard profiles.

SUMMARY OF THE INVENTION

A first subject of the invention is a method for determining a parameter of a particle present in a sample, the sample lying between an image sensor and a light source, the image sensor lying in a detection plane, the method comprising the following steps:
   a) illuminating the sample with the light source, the light source emitting an incident light wave that propagates along a propagation axis;
   b) acquiring an image of the sample with the image sensor, the image sensor being exposed to an exposure light wave;
   c) determining a position of the particle in the detection plane or in a plane parallel to the detection plane;
   d) on the basis of the acquired image, applying a propagation operator, for a plurality of distances from the detection plane, so as to estimate, at each distance, a complex amplitude of the exposure light wave;
   e) on the basis of the complex amplitude estimated, at various distances, obtaining a profile representing a variation of a property of the exposure light wave along an axis parallel to the propagation axis and passing through the position of the particle.

The particle may be associated with a set of parameters, comprising at least a size of the particle and a refractive index of the particle.

The method may comprise:
   f) modelling a particle, taking into account a value of each parameter of the set of parameters, and modelling an exposure light wave, propagating toward the image sensor, under the effect of an illumination, with the light source, of the modelled particle;
   g) on the basis of the modelled exposure light wave, forming a profile representing a variation in the complex amplitude of the modelled exposure light wave, along an axis parallel to the propagation axis;
   h) comparing the profile obtained in step e) with the modelled profile resulting from step g), so as to determine the value of at least one parameter of the particle.

According to one embodiment, the refractive index is a complex quantity: it comprises a real part and an imaginary part.

According to one embodiment, the set of parameters also comprises a position of the particle along the propagation axis.

According to one embodiment, step f) comprises modelling particles respectively having various values of at least one parameter, so as to obtain, following step g), a database of modelled profiles, each modelled profile being associated with one set of parameters. Step h) may comprise minimizing a deviation between the profile resulting from step e) and the profiles of the database, the respective values of the parameters of the particle being those minimizing the deviation. The deviation may be a squared deviation.

According to one embodiment, f), g) and h) are carried out iteratively, the value of a parameter of the particle resulting from one iteration being used to initialize a following iteration. The parameter may be the refractive index, and/or the size and/or a distance with respect to the detection plane.

According to one embodiment, f) comprises modelling particles of various sizes and/or of various refractive indices, so as to obtain, following g), a database of modelled profiles, each modelled profile being associated with a size and/or a refractive index, h) may comprise determining the size of the particle and/or the refractive index of the particle.

According to one embodiment, f) comprises modelling particles located at various distances from the detection plane, so as to obtain, following g) a database of modelled profiles, each modelled profile being associated with a distance with respect to the detection plane. Step h) may comprises determining the distance between the particle and the detection plane.

According to one embodiment, steps f) to h) are implemented iteratively, such that, in each iteration, the profile modelled in g) gets gradually closer to the profile determined in e). Step h) of an iteration may comprise determining a deviation between the profile modelled in step g) of the same iteration and the profile resulting from step e). Step h) may also comprise determining a gradient of the deviation as a function of at least one parameter of the set of parameters so as to determine the values of the parameters of the particle modelled in step f) of the following iteration.

Step h) may comprise determining the distance between the particle and the detection plane.

Whatever the embodiment, the method may comprise:
applying a propagation operator to the acquired image, while considering a plurality of distances with respect to the detection plane, so as to obtain a stack of reconstructed images, each reconstructed image being associated with a distance with respect to the detection plane;
on the basis of a reconstructed image, estimating a size of the particle;
such that in step h) the size of the particle estimated on the basis of the reconstructed image is taken into account. The reconstructed image, on the basis of which the size of the particle is estimated, is preferably an image reconstructed in a reconstruction plane passing through the particle. Such an image forms an observation image of the particle. The position of the reconstruction plane corresponding to the observation image may be determined by implementing a numerical focusing algorithm.

Whatever the embodiment, step h) may comprise determining a modelled profile closest to the profile resulting from step e). The values of the parameters of the particle then respectively correspond to the values of the parameters associated with the closest modelled profile, i.e. to the values of the parameters of the modelled particle having allowed the closest modelled profile to be obtained.

The particle may in particular be a cell, the method comprising determining an alive or dead state of the cell depending on the refractive index. Preferably, the refractive index comprises a real part and an imaginary part, the alive or dead state of the cell being defined depending on a comparison between the real part and the imaginary part.

According to one embodiment, there is no image-forming optic between the sample and the image sensor.

According to one embodiment, an optical system lies between the sample and the image sensor, the optical system defining an image plane and an object plane, and wherein, in b), the image is acquired in a defocused configuration, the detection plane being offset with respect to the image plane, and/or a plane of the sample, in which the sample lies, being offset with respect to the object plane.

Another subject of the invention is a device for observing a sample, the sample comprising particles, the device comprising:

a light source, configured to illuminate the sample;
a sample holder, configured to receive the sample;
an image sensor, placed such that when the sample is placed on the holder, it lies between the image sensor and the light source, the image sensor being configured to acquire an image of the sample;
a processor, configured to implement steps d) to h) of a method of the first subject of the invention, on the basis of an image acquired by the image sensor.

According to one embodiment, no image-forming optic is placed between the image sensor and the processor.

According to one embodiment, an optical system lies between the sample and the image sensor, the optical system defining an image plane and an object plane, the device comprising a means for adjusting the optical system, or the sample, or the image sensor, such that:
the detection plane is offset from the image plane;
and/or the object plane is offset from a plane of the sample, in which the sample lies.

Other advantages and features will become more clearly apparent from the following description of particular embodiments of the invention, which are given by way of nonlimiting example, and shown in the figures listed below.

FIGURES

FIGS. 2A to 2F are the results of modelling a diffraction pattern or profiles corresponding to cells the parameters of which are known. The same goes for FIGS. 3A to 3F.

FIGS. 4A to 4D schematically show the main steps of various embodiments.

Figure 5A:
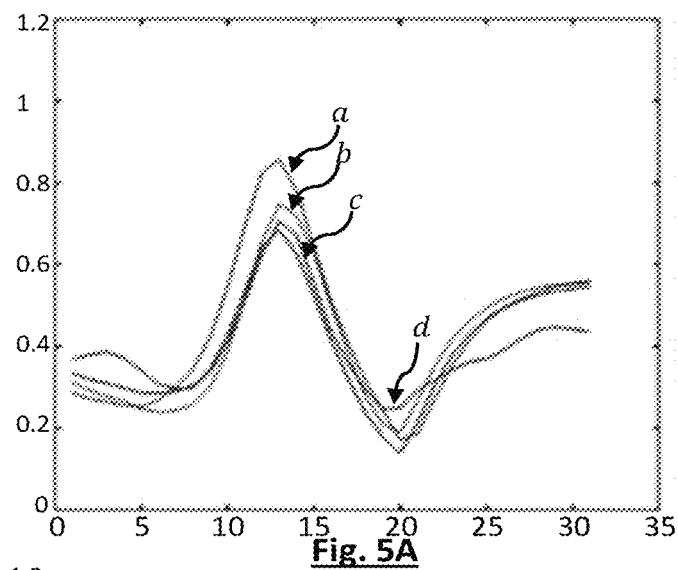
Figure 5B:
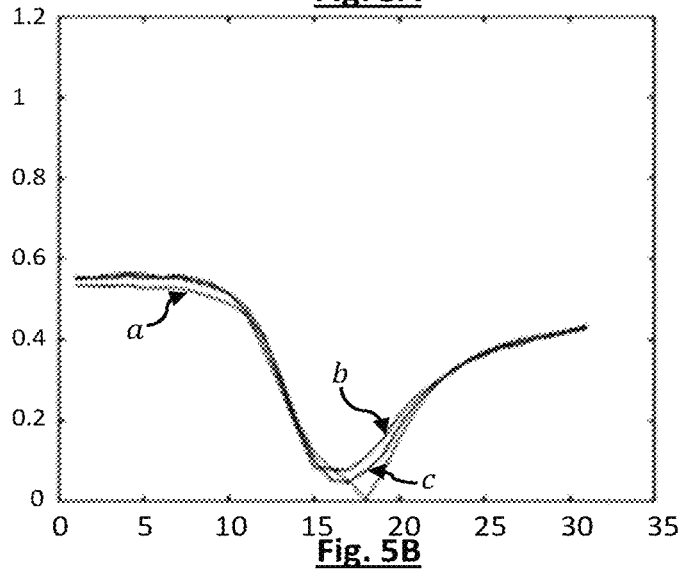
Figure 5C:
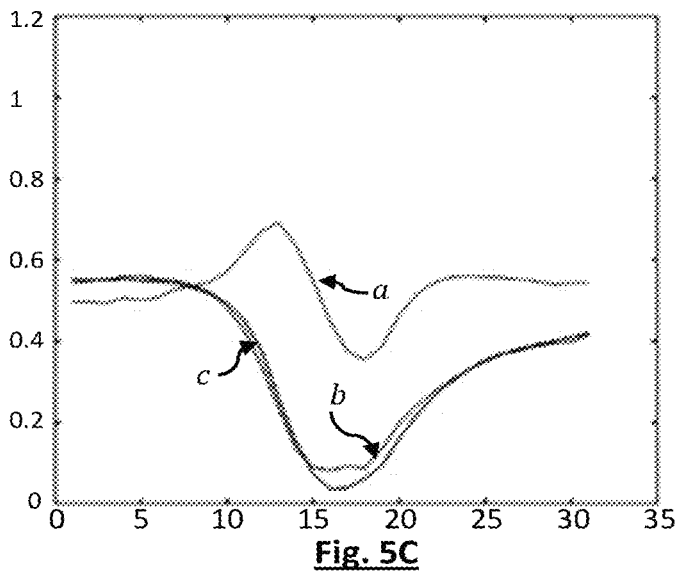

FIGS. 5A to 5C illustrate determination of parameters of a cell.

Figure 6A:
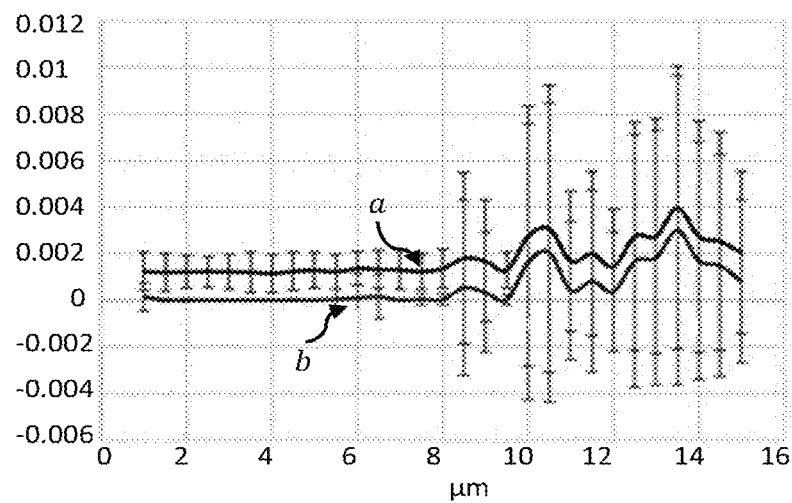
Figure 6B:
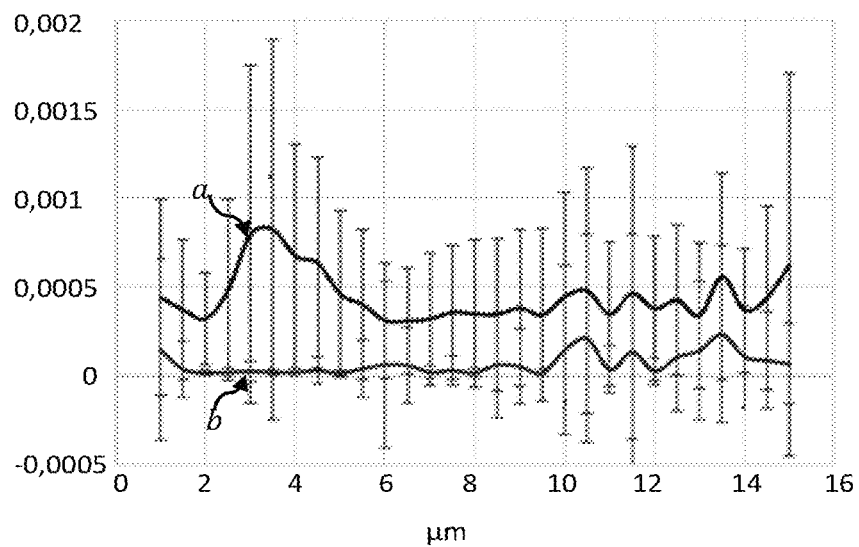

FIGS. 6A and 6B show the variation in a quantification error affecting the estimations of the real part and of the imaginary part of the refractive index as a function of particle size, respectively.

Figure 7:
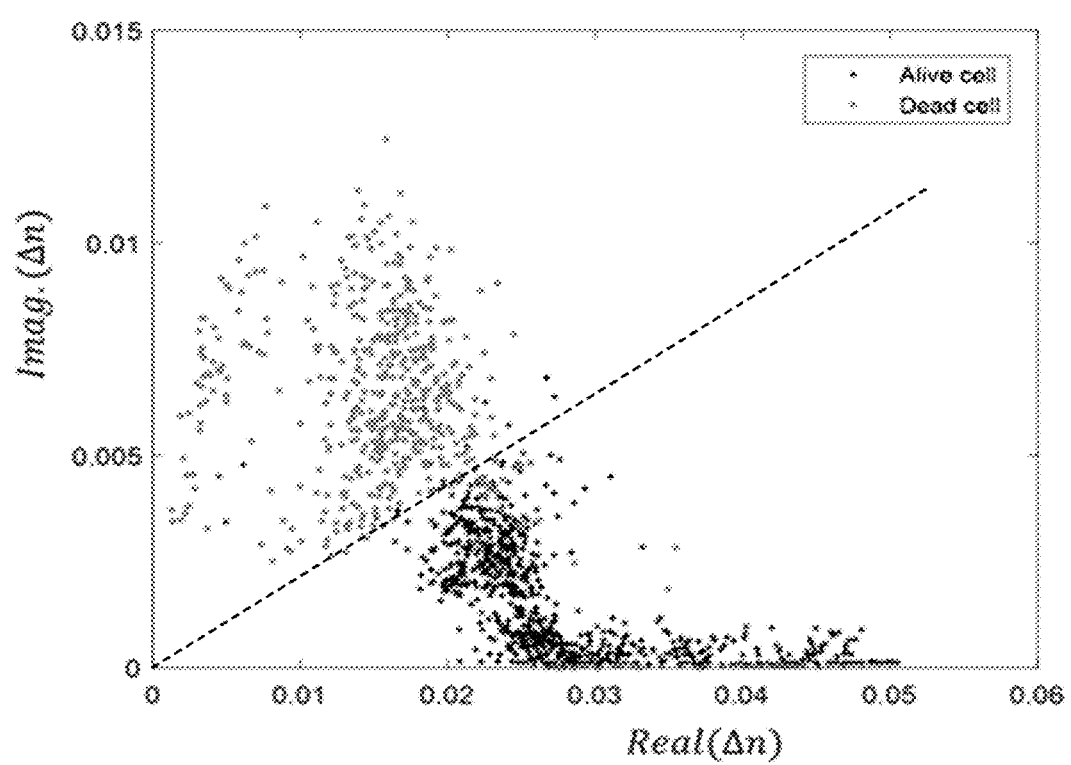

FIG. 7 shows an example of application of the invention to classification of living cells and dead cells.

Figure 8:
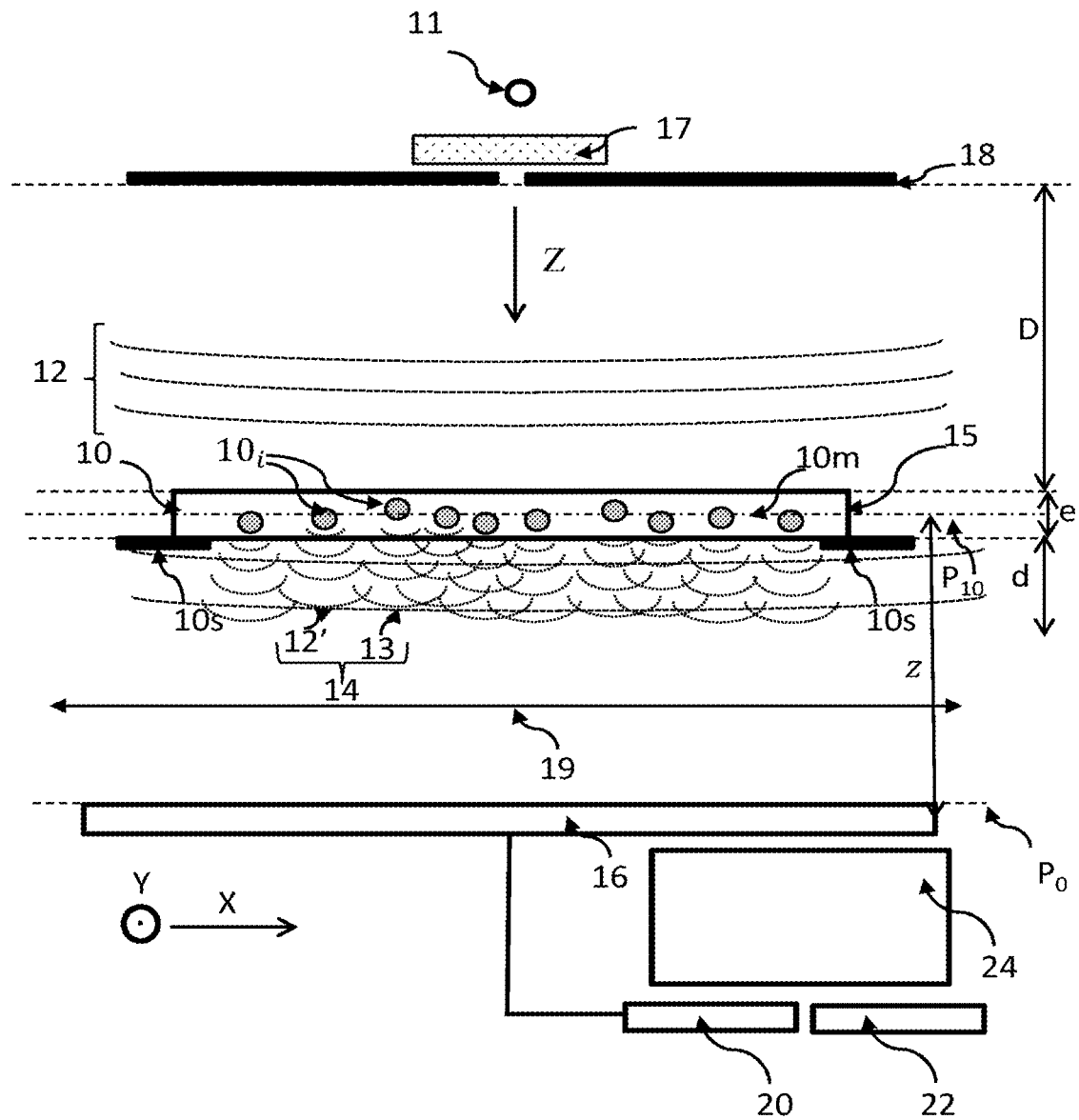

FIG. 8 shows another device allowing the invention to be implemented.

DESCRIPTION OF PARTICULAR EMBODIMENTS

Figure 1:
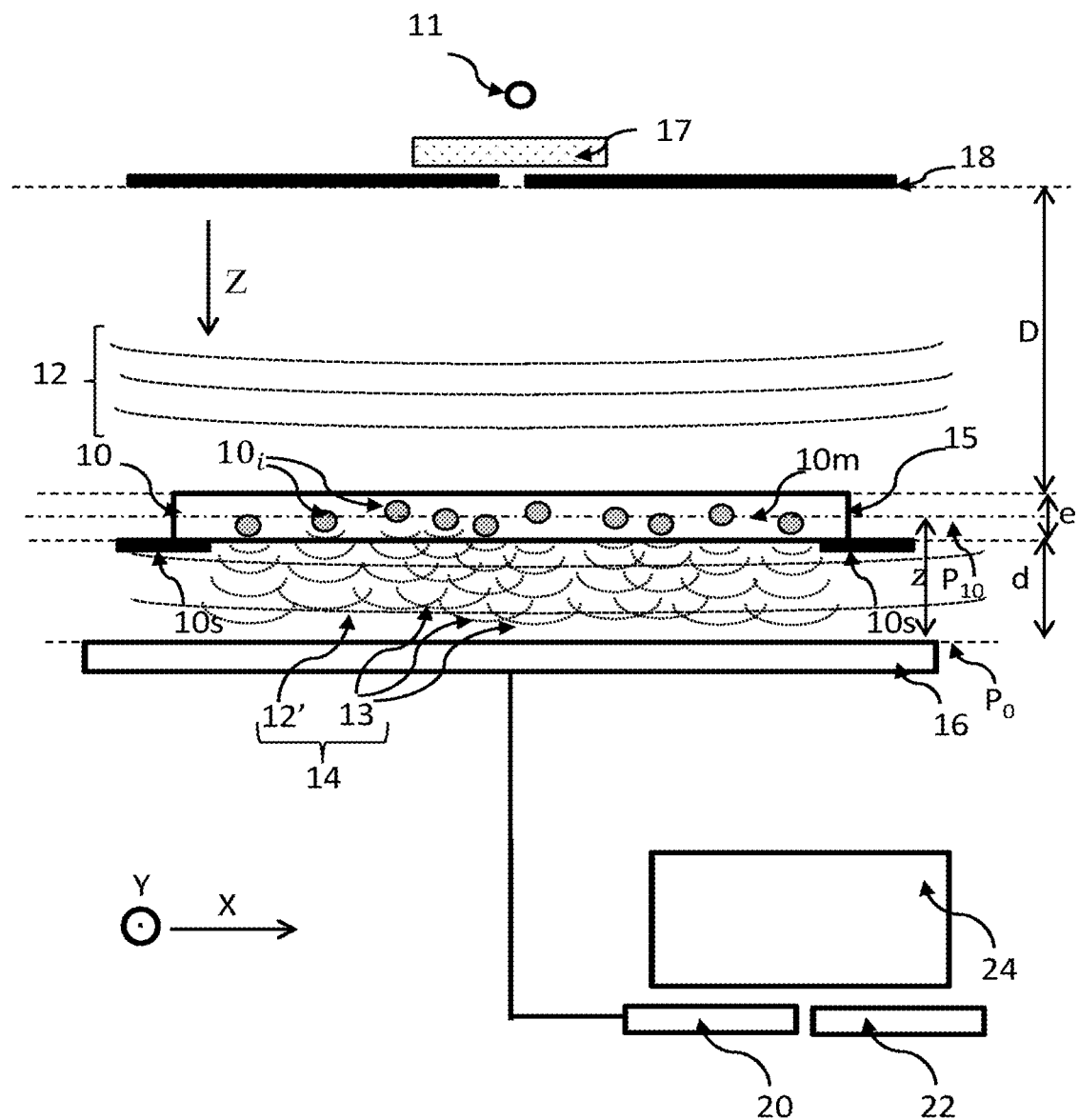
FIG. 1 shows a device allowing the invention to be implemented.

FIG. 1 shows an example of a device according to the invention. A light source 11 is configured to emit a light wave 12, called the incident light wave, that propagates in the direction of a sample 10, along a propagation axis Z. The light wave is emitted in an illumination spectral band $\Delta\lambda$.

The sample 10 is a sample that it is desired to characterize. It notably comprises a medium $10m$ in which particles $10_i$ bathe. The medium $10m$ may be a liquid medium. It may comprise a bodily liquid, for example obtained from blood or urine or lymph or cerebrospinal fluid. It may also be a culture medium, comprising nutrients allowing the development of microorganisms or cells. By particle, what is notably meant, non-exhaustively is:
a cell, whether it be a question of a culture cell or a bodily cell, for example a blood cell;
a microorganism, for example a bacterium or a yeast or a microalgae;
a solid particle, for example a microsphere, the microsphere possibly being functionalized, so as to promote grafting with an analyte;

a particle forming an emulsion in the medium 10*m*, in particular a particle that is insoluble in the medium 10*m*, one example being a lipid droplet in an aqueous medium.

A particle $10_i$ may be solid or liquid.

The sample 10 is, in this example, contained in a fluidic chamber 15. The fluidic chamber 15 is for example a Gene Frame® fluidic chamber of thickness e=250 µm. The thickness e of the sample 10, along the propagation axis, typically varies between 10 µm and 1 cm, and is preferably comprised between 20 µm and 500 µm. The sample lies in a plane $P_{10}$, called the plane of the sample, perpendicular to the propagation axis Z. The plane of the sample is defined by the axes X and Y shown in FIG. 1. The sample is kept on a holder 10*s* at a distance d from an image sensor 16. The concentration of particles may vary between 50 per microliter and 500 000 per microliter. It may for example be equal to 100000 per microliter.

The distance D between the light source 11 and the fluidic chamber 15 is preferably larger than 1 cm. It is preferably comprised between 2 and 30 cm. Advantageously, the light source 11, seen by the sample, may be considered to be point-like. This means that its diameter (or its diagonal) is preferably smaller than one tenth, and better still one hundredth of the distance between the fluidic chamber 15 and the light source. In FIG. 1, the light source is a light-emitting diode. It is generally associated with a diaphragm 18, or spatial filter. The aperture of the diaphragm is typically comprised between 5 µm and 1 mm, and preferably between 50 µm and 500 µm. In this example, the diaphragm is the type of diaphragm supplied by Thorlabs under the reference P150S and its diameter is 150 µm. The diaphragm may be replaced by an optical fiber, a first end of which is placed facing the light source 11 and a second end of which is placed facing the sample 10. The device shown in FIG. 1 also comprises a diffuser 17, placed between the light source 11 and the diaphragm 18. The use of such a diffuser makes it possible to relax constraints on the centrality of the light source 11 with respect to the aperture of the diaphragm 18. The function of such a diffuser is to distribute the light beam produced by an elementary light source 11 into a cone of angle α. Preferably, the scattering angle α varies between 10° and 80°. Alternatively, the light source may be a laser source, such as a laser diode. In this case, it is not useful to associate therewith a spatial filter or a diffuser.

Preferably, the emission spectral band Δλ of the incident light wave 12 has a width smaller than 100 nm. By spectral bandwidth, what is meant is a fullwidth at half maximum of said spectral band.

The sample 10 is placed between the light source 11 and the aforementioned image sensor 16. The image sensor 16 defines a detection plane $P_0$, which preferably lies parallel, or substantially parallel, to the plane $P_{10}$ in which the sample lies. The term substantially parallel means that the two elements may not be rigorously parallel, an angular tolerance of a few degrees, smaller than 20° or 10°, being acceptable.

The image sensor 16 is configured to form an image $I_0$ of the sample 10 in the detection plane $P_0$. In the example shown, it is a question of a CCD or CMOS image sensor 16 comprising a matrix array of pixels. The detection plane $P_0$ preferably lies perpendicular to the propagation axis Z of the incident light wave 12. The distance d between the sample 10 and the matrix array of pixels of the image sensor 16 is preferably comprised between 50 µm and 2 cm, and preferably comprised between 100 µm and 2 mm.

The absence of magnifying or image-forming optics between the image sensor 16 and the sample 10 will be noted in this embodiment. This does not prevent focusing micro-lenses potentially being present level with each pixel of the image sensor 16, said micro-lenses not having the function of magnifying the image acquired by the image sensor, their function rather being to optimize detection performance.

The light source 11 may comprise elementary light sources, emitting in the various spectral bands. The image sensor is then configured to acquire, simultaneously or successively, an image $I_0$ in each spectral band. Thus, the term image $I_0$ acquired by the image sensor may designate a set of images acquired in various spectral bands, following the illumination of the sample in the various spectral bands.

As mentioned in the patent applications cited with respect to the prior art, under the effect of the incident light wave 12, the particles $10_i$ present in the sample may generate a diffracted wave 13, liable to produce, in the detection plane $P_0$, interference, in particular with a portion 12' of the incident light wave 12 transmitted by the sample. Moreover, the sample may absorb a portion of the incident light wave 12. Thus, the light wave 14, transmitted by the sample, and to which the image sensor 16 is exposed, designated by the term "exposure light wave", may comprise:

a component 13 resulting from the diffraction of the incident light wave 12 by each particle of the sample;

a component 12' resulting from the transmission of the incident light wave 12 by the sample, a portion of the latter possibly being absorbed in the sample.

These components form interference in the detection plane. Thus, each image acquired by the image sensor comprises interference patterns (or diffraction patterns), each interference pattern possibly being associated with a particle $10_i$ of the sample.

A processor 20, for example a microprocessor, is configured to process each image $I_0$ acquired by the image sensor 16. In particular, the processor is a microprocessor connected to a programmable memory 22 in which a sequence of instructions for performing the image-processing and computing operations described in this description is stored. The processor may be coupled to a screen 24 allowing the display of images acquired by the image sensor 16 or computed by the processor 20.

An image $I_0$ acquired by the image sensor 16, also called a hologram, may be the subject of a reconstruction, called a holographic reconstruction. As described with reference to the prior art, it is possible to apply, to the image acquired by the image sensor, a holographic propagation operator h, so as to compute a complex amplitude $A(x,y,z)$ representative of the exposure light wave 14, and to do so at any point of spatial coordinates (x,y,z), and more particularly between the image sensor and the sample. The coordinates (x,y) designate coordinates, called radial coordinates, parallel to the detection plane $P_0$. The coordinate z is a coordinate along the propagation axis Z, expressing a distance between the sample 10 and the image sensor 16.

The complex amplitude may be obtained via one of the following expressions: $A(x,y,z)=I_0(x,y,z)*h$, * designating the convolution operator, or, and preferably, $A(x,y,z)=\sqrt{I_0(x,y,z)}*h$, or indeed:

$$A(x, y, z) = \frac{\sqrt{I_0(x, y, z)}}{I_0} * h,$$

$I_0$ being an average of the acquired image.

The function of the propagation operator h is to describe the propagation of light between the image sensor 16 and a point of coordinates (x,y,z) located at a distance |z| from the image sensor.

It is then possible to determine a property of the exposure light wave 14, for example the modulus M(x,y,z) and/or the phase φ (x,y,z), at the distance |z| with:

M (x,y,z)=abs [A(x,y,z)];

φ(x,y,z)=arg [A(x,y,z)];

The operators abs and arg designate the modulus and argument, respectively.

The distance |z| is a reconstruction distance.

The propagation operator is for example the Fresnel-Helmholtz function, such that:

$$h(x, y, z) = \frac{1}{j\lambda z} e^{j2\pi \frac{z}{\lambda}} esp\left(j\pi \frac{x^2 + y^2}{\lambda z}\right).$$

The complex expression A(x,y,z) of the light wave 14, at any point of spatial coordinates (x,y,z), is such that: A(x,y,z)=M (x,y,z)$e^{j\varphi(x,y,z)}$.

The complex expression A is a complex quantity the argument and modulus of which are respectively representative of the phase and intensity of the exposure light wave 14 detected by the image sensor 16 in order to form the image $I_0$.

By determining the complex amplitude, for a given radial position (x,y), along the Z-axis, at a plurality of coordinates z, it is possible to form a profile representative of the exposure light wave. It may be a question of a profile of the phase or of the modulus of the exposure light wave. Generally, it is a question of a profile of an optical property of the exposure light wave, the term optical property designating a property obtained using the complex amplitude A(x,y,z), and representative of the latter. It may be a question of the modulus, of the phase, of the real part, of the imaginary part, or of a combination thereof.

According to one embodiment, the image $I_0$ is convoluted with the propagation operator h. This allows a complex image $A_z$ representing a spatial distribution of the complex expression A in a reconstruction plane $P_z$, lying at a distance |z| from the detection plane $P_0$, to be obtained. In this example, the detection plane $P_0$ has the equation z=0. The complex image $A_z$ corresponds to a complex image of the sample in the reconstruction plane $P_z$. It also represents a two-dimensional spatial distribution of the optical properties of the exposure light wave 14. Such a method, designated by the term holographic reconstruction, notably allows an image of the modulus or of the phase of the exposure light wave 14 in the reconstruction plane to be reconstructed.

It is possible to form images $M_z$ and $\varphi_z$ respectively representing the modulus or phase of a complex image $A_z$ in a plane $P_z$ located at a distance |z| from the detection plane $P_0$, with $M_z$=mod ($A_z$) and $\varphi_z$=arg($A_z$). When the reconstruction plane corresponds to a plane in which the sample lies, the images $M_z$ and $\varphi_z$ allow the sample to be observed with a correct spatial resolution.

When complex images $A_z$ are formed for various reconstruction distances, a stack of complex images $A_{z_1} \ldots A_{z_n}$ is obtained, each complex image being defined, in the radial coordinates (x,y), respectively at reconstruction distances $z_1 \ldots z_n$ with respect to the detection plane. Each complex image $A_z$ of the stack of images $A_{z_1} \ldots A_{z_n}$ corresponds to one reconstruction distance z. On the basis of the value of each complex image at a radial coordinate ($x_i$, $y_i$), corresponding to one particle 10$_i$, it is possible to obtain the value of an optical property for the various reconstruction distances, the interpolation of which allows a profile $F_{x_i,y_i}$ to be formed. When the optical property in question is the modulus, the profile $F_{x_i,y_i}$ is noted $M_{x_i,y_i}$. When the optical property in question is the phase, the profile $F_{x_i,y_i}$ is noted $\varphi_{x_i,y_i}$. The profile corresponds to a variation of the optical property along an axis parallel to the propagation axis Z, and passing through the radial coordinate ($x_i$, $y_i$) of the particle 10$_i$.

The complex images $A_{z_1} \ldots A_{z_n}$ may be formed using an iterative holographic reconstruction algorithm, such as described in WO2016189257 or in WO2017162985. With such algorithms, the phase of the exposure light wave in the detection plane is gradually adjusted. In WO2016189257, the adjustment of the phase is achieved iteratively, the phase of light waves reconstructed in the plane of the sample, in various spectral bands, being averaged in each iteration. In WO2017162985, the adjustment of the phase is achieved iteratively so as to minimize, in each iteration, the reconstruction noise of a reconstructed complex image in the plane of the sample.

According to a first option, described in WO2017050672, a stack of complex images $A_{z_1} \ldots A_{z_n}$ is obtained by applying an iterative reconstruction algorithm to an image $I_0$ acquired by the image sensor. The iterative algorithm is applied so as to reconstruct a complex image, called the reference complex image $A_{10}$, in the plane $P_{10}$ of the sample. It is assumed that the reference complex image $A_{10}$ forms a good descriptor of the exposure light wave 14. It in particular comprises reliable estimations of the modulus and phase of the exposure light wave 14 in the plane $P_{10}$ of the sample. The other complex images forming the stack of images $A_{z_1} \ldots A_{z_n}$ are obtained by simply convoluting the reference complex image $A_{10}$ with a propagation operator h such as described above.

According to another option, each complex image $A_z$ of the stack of images $A_{z_1} \ldots A_{z_n}$ is obtained by successive application of an iterative reconstruction algorithm to the image $I_0$ acquired by the image sensor, various reconstruction distances $z_1 \ldots z_n$ being considered.

It is not absolutely necessary to use a stack of complex images to establish a profile $F_{x_i,y_i}$. A profile $F_{x_i,y_i}$ may be obtained by estimating the complex amplitude $A(x_i,y_i,z)$ of the exposure light wave at various coordinates z, for given radial coordinates ($x_i,y_i$), on the basis of one acquired image $I_0$ or of a plurality of images acquired in different spectral bands.

One important aspect of the invention is the use of modelled profiles established on the basis of modelled particles 10(par). To do this, a set of parameters par of a particle is taken into account. Then, via a numerical model, the complex amplitude of an exposure light wave 14$_{mod}$, propagating between the modelled particle and the image sensor 16, and resulting from an illumination of the modelled particle 10(par) with the light source 11, is modelled.

The model may notably be based on Mie scattering. Mie scattering is a model of elastic scattering allowing a solution to be obtained to Maxwell's equations, describing a light wave diffracted by a spherical particle illuminated by a monochromatic incident light wave of wavelength λ. Apart from its spherical shape, the particle is characterized by a refractive index n, the latter possibly notably being a complex refractive index n=Re(n)+jIm(n), with $j^2$=−1. Re et Im are operators that return the real part and imaginary part, respectively.

A modelled particle may also be characterized by its dimension, for example its diameter or its radius. The application of the Mie-scattering model allows a diffraction pattern $I_{mod}$ (par) to be simulated at various distances from the sample. This notably allows a diffraction pattern $I_{0,mod}$ (par) to be formed in the detection plane $P_0$, as shown in FIGS. 2A to 2C and 3A to 3C. The notation $I_{0,mod}$ (par) designates the fact that the diffraction pattern is modelled in the detection plane $P_0$, as a function of a set of parameters par. The set of parameters par may form a vector of parameters, in the sense that the set of parameters may be represented in vector form.

FIGS. 2A, 2B and 2C are simulations of a diffraction pattern $I_{0,mod}$ (par), in the detection plane, resulting from the diffraction of a light wave of 450 nm wavelength, by a modelled particle 10(par) the diameter of which is equal to 20 µm, 15 µm and 10 µm, respectively, and propagating through a medium of index equal to 1.33. The refractive index n of the particle is 1.37, i.e. an index difference Δn equal to 0.04 with respect to the index of the medium. In these figures, the imaginary part Im(n) of the refractive index has been considered to be zero.

In order to take into account in the imperfections of the image sensor 16, the modelled diffraction patterns have been spatially sampled considering a pixel pitch, the latter being, in this example, equal to 1.67 µm. The figures were then blurred by applying a Gaussian filter in order to take into account the noise of the image sensor. The distance between the image sensor 16 and the modelled particle 10(par) was considered to be equal to 1000 µm.

Each of these figures was obtained by modelling, in the detection plane $P_0$, the complex amplitude A(x,y,z) of the exposure light wave $14_{mod}$ propagating toward the detection plane, the modelled exposure light wave resulting from the illumination of the modelled particle. The model of the complex amplitude A(x,y,z), in the detection plane $P_0$, was then extracted so as to make it possible to simulate the diffraction pattern formed in the image acquired by the image sensor.

From the modelled diffraction pattern $I_{0,mod}$ (par), it is possible to form a profile, called the modelled profile F(par), representing a variation, parallel to the propagation axis Z, of the complex amplitude A(x,y,z) of the modelled exposure light wave $14_{mod}$. The modelled profile F(par) is preferably established, from the modelled diffraction pattern $I_{0,mod}$, in the same way as the profile $F_{x,y}$ was established from the acquired image $I_0$. When the profile $F_{x,y}$ was established by forming a stack of complex images from the acquired image $I_0$, the modelled profile F(par) is established by forming a stack of complex images $A_{z_1,mod} \ldots A_{z_n,mod}$ from the modelled diffraction pattern $I_{0,mod}$. The modelled profile F(par) represents a model of the variation in the complex amplitude $A_{mod}$(x,y,z) of the modelled exposure light wave $14_{mod}$, and passing through a determined radial position. The radial position may notably correspond to the center of the diffraction pattern, this also corresponding to the coordinates of the center of the modelled particle in a plane parallel to the detection plane.

FIGS. 2D, 2E and 2F are profiles F(par) of the modulus of the modelled complex expression $A_{mod}$(x,y,z), passing through a radial coordinate (x,y) located at the center of a modelled particle 10(par), the diameter of which is equal to 20 µm, 15 µm and 10 µm, respectively. In each figure, three distances between the image sensor and the modelled particle have been considered, the distances being 1000 µm, 1800 µm and 2600 µm, respectively. In the graphs, the abscissa 0 corresponds to the position of the particle. The unit of the abscissa axis is µm.

Figure 3A:
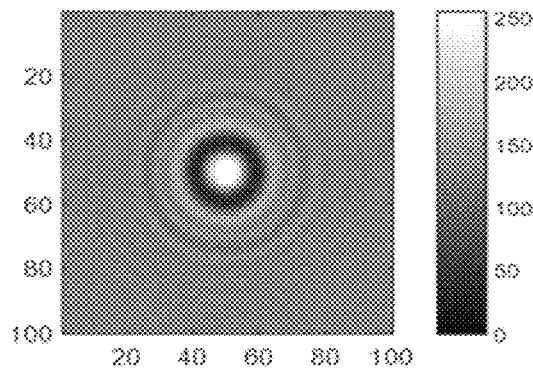
Figure 3D:
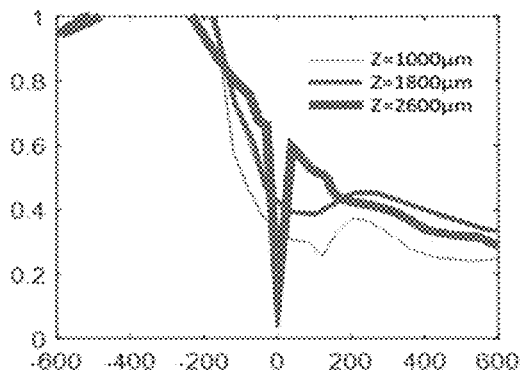
Figure 3B:
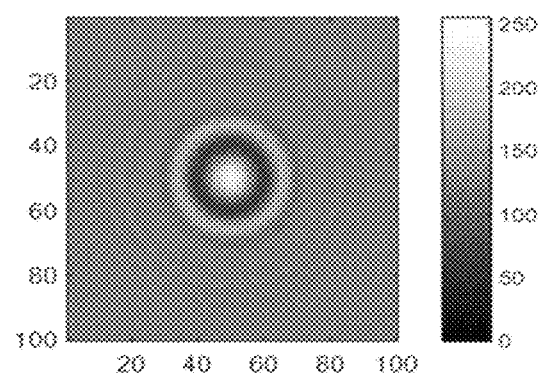
Figure 3E:
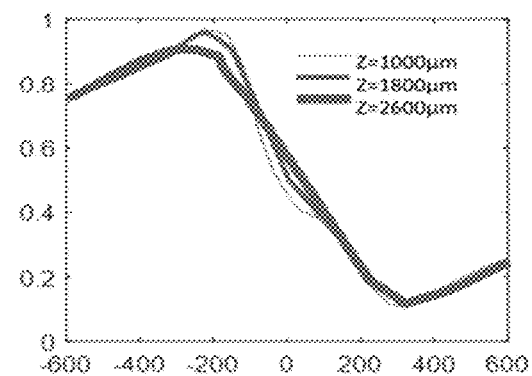
Figure 3C:
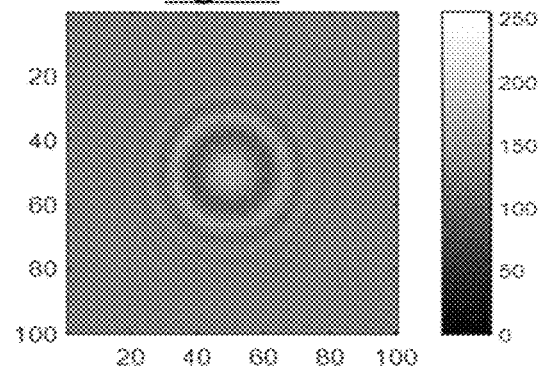
Figure 3F:
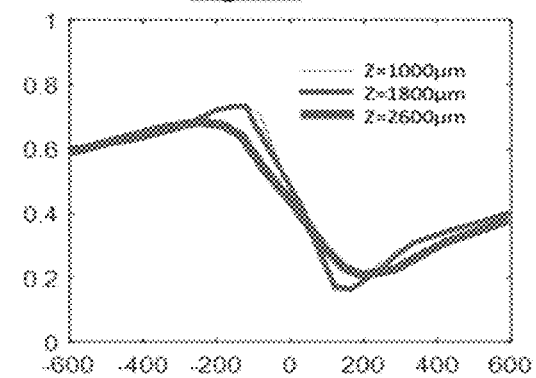

FIGS. 3A, 3B and 3C are simulations of a diffraction pattern resulting from the diffraction of a light wave of 450 nm wavelength, by a particle the diameter of which is equal to 20 µm, 15 µm and 10 µm, respectively, propagating through a medium of index equal to 1.33. The refractive index n of each particle is 1.37, i.e. an index difference Δn equal to 0.01 with respect to the index of the medium. FIGS. 3D, 3E and 3F are profiles F(par) of the modulus of the modelled complex expression, passing through a radial coordinate (x,y) located at the center of a modelled particle 10(par), the diameter of which is equal to 20 µm, 15 µm and 10 µm, respectively. In each figure, three distances between the image sensor and the particle have been considered, the distances being 1000 µm, 1800 µm and 2600 µm, respectively.

Comparison of FIGS. 2D/3D, 2E/3E and 2F/3F shows that, for a given particle size, a small variation in refractive index has a substantial influence on the profile.

FIGS. 2A to 2F and 3A to 3F show that it is possible to model the complex amplitude of the exposure light wave 14 to which the image sensor 16 is exposed. This in particular allows profiles F(par), for example profiles of modulus or of phase, corresponding to particles, the parameters (size, refractive index n) of which are known, to be modelled numerically. More generally, the model allows a profile F(par), representative of the complex amplitude of the exposure light wave, to be established for a particle the parameter, or the parameters par, of which are known. By profile representative of the complex amplitude of the exposure light wave, what is meant is a profile of a quantity established on the basis of the complex amplitude: the quantity may be established from the modulus, or from the phase, or from the real part or from the imaginary part.

The parameters of the particle form a set par that may comprise:
  a refractive index n of the particle, this index possibly being a complex quantity, or a variation in the refractive index n of the particle with respect to the ambient medium 10m;
  and/or a dimension of the particle, of the radius r or diameter d type;
  and/or a distance z of the particle with respect to the detection plane.

Each modelled profile also depends on wavelength λ.

This is one notable difference with respect to the prior art, in which the standard profiles are obtained experimentally, using known samples. The invention makes it possible to avoid using known samples to form the standard profiles. In addition, generating modelled profiles allows precise quantitative values to be obtained for the parameters of a particle. The invention notably allows a quantitative value to be obtained for the refractive index of a particle.

In the preceding paragraphs, with reference to FIGS. 2A to 2F and 3A to 3F, the obtainment of modelled profiles F(par) in two steps was described, these two steps being:
  modelling a diffraction pattern $I_{0,mod}$ in the detection plane;
  to the modelled diffraction pattern, applying a numerical reconstruction algorithm in order to establish a profile F(par), parallel to the propagation axis Z, of a complex amplitude $A_{mod}$(X, y, z) of a modelled exposure light wave $14_{mod}$.

Alternatively, the modelled profiles may be obtained without necessarily modelling a diffraction pattern $I_{0,mod}$ in the detection plane. The complex amplitude of the exposure light wave $14_{mod}$ along the propagation axis Z is then modelled. However, the inventors believe that it is preferable to model the diffraction pattern $I_{0,mod}$(par), then to form the profile F(par) corresponding to the modelled particle in the same way as a profile $F_{x_i,y_i}$, passing through a coordinate $(x_i, y_i)$, is formed, on the basis of the image $I_0$ acquired by the image sensor.

Whatever the way in which they are obtained, the profiles F(par) thus modelled may be stored in a database, so as to be exploited in a method the main steps of which are described below, with reference to FIGS. 4A to 4D. Each profile is associated with a set of parameters (par).

Step 100: illuminating the sample 10 using the light source 11.

Step 110: Acquiring an image $I_0$ of the sample 10 with the image sensor 16, this image forming a hologram. One of the advantages of the lensless configuration, which is shown in FIG. 1, is the large observed field, allowing a large volume of sample to be simultaneously addressed. This allows a plurality of particles to be observed simultaneously, and thus a rapid characterization of the sample to be obtained. The observed field depends on the size of the image sensor, it being slightly smaller than the detection area of the latter, because of the space between the pixels of the sensor and the sample. The observed field is generally larger than 10 mm², and is typically comprised between 10 mm² and 50 mm², this being significantly larger than with a microscope.

Step 120: Detecting particles in the sample. The acquired image $I_0$ generally contains a high number of interference patterns. Because of the overlap between the various interference patterns, the acquired image is generally not easily usable to locate the particles present in the observed field. The latter are more easily identifiable in a complex image reconstructed by applying a holographic propagation operator h to the acquired image $I_0$.

Thus, the step 120 comprises reconstructing at least one image, called the observation image I', of the sample. A holographic reconstruction operator is applied to the acquired image, for a reconstruction distance, so as to obtain a complex image representing the complex amplitude of the exposure light wave 14 in a reconstruction plane parallel to the detection plane and located at the reconstruction distance of the latter. The observation image I' may be the image of the modulus or phase of the complex image thus reconstructed. The reconstruction plane in which the observation image is defined is preferably a plane $P_{10}$ in which the sample 10 lies. Its position may be set beforehand, or determined using a numerical focusing algorithm, this type of algorithm be known to those skilled in the art.

In the observation image I', the particles $10_i$ appear sufficiently contrasted to be easily discernible from the ambient medium $10m$.

Step 130: Determining a radial position $(x_i, y_i)$ of each particle $10_i$. It is a question of obtaining a radial position representative of each particle discernible in the observation image or in the acquired image $I_0$, when the latter is exploitable. A segmenting algorithm may be applied to the observation image, so as to extract regions of interest $ROI_i$ respectively corresponding to each particle $10_i$.

Step 140: Forming a profile $F_{x_i,y_i}$ for each particle $10_i$ to which a radial position $(x_i, y_i)$ corresponds. It is a question of establishing a profile $F_{x_i,y_i}$ representative of the variation in the complex amplitude of the exposure light wave parallel to the propagation axis Z, the profile $F_{x_i,y_i}$ passing through the radial position $(x_i, y_i)$ associated with each particle $10_i$. The profile $F_{x_i,y_i}$ may be a profile of the modulus of the exposure light wave: $F_{x_i,y_i} = M_{x_i,y_i}$. The profile may be a profile of the phase of the exposure light wave: $F_{x_i,y_i} = \varphi_{x_i,y_i}$. It may also be a question of a profile representing a variation in the real part or in the imaginary part of the particle.

Step 150: Comparing the profile $F_{x_i,y_i}$ formed from each particle with modelled profiles F(par), each modelled profile being parameterized by a set of parameters par as mentioned above. The set of parameters par for example comprises a refractive index n, or a refractive index difference Δn due to the particle. The step 150 comprises determining the modelled profile F*(par) closest to the profile $F_{x_i,y_i}$ formed for the particle. The parameters $par_i$ of the particle $10_i$ are the parameters associated with the closest modelled profile F*(par).

Figures 4A, 4B:
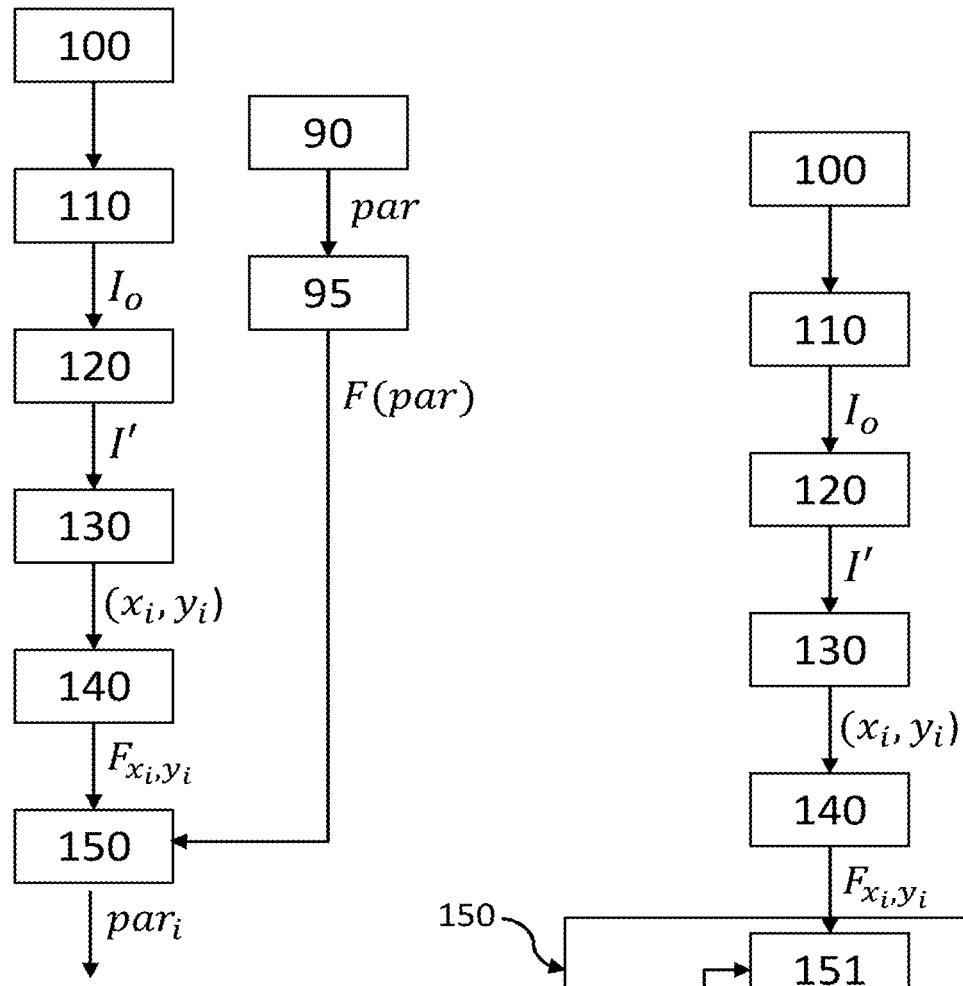

In the method shown in FIG. 4A, the profile $F_{x_i,y_i}$ is compared to each modelled profile F(par), so as to determine the parameters of the profile minimizing the comparison. The comparison may for example comprise a squared deviation, in which case:

$$par_i = \operatorname*{argmin}_{par}[F_{x_i,y_i} - F(par)]^2 \quad (1)$$

When the profile $F_{x_i,y_i}$ is a profile representing a variation in the modulus of the complex amplitude of the exposure light wave, $$par_i = \operatorname*{argmin}_{par}[M_{x_i,y_i} - M(par)]^2, \quad (2)$$

where M(par) corresponds to modelled profiles of the modulus of a complex amplitude of a modelled exposure light wave $14_{mod}$ taking into account various values of the vector of parameters par.

When the profile $F_i$ is a profile representing a variation in the phase of the complex amplitude of the exposure light wave, $$par_i = \operatorname*{argmin}_{par}[\varphi_{x_i,y_i} - \varphi(par)]^2 \quad (3)$$

where φ(par) corresponds to modelled profiles of the phase of a complex amplitude of a modelled exposure light wave $14_{mod}$ taking into account various values of the vector of parameters par.

According to one embodiment, the determination of the parameters of a particle may combine various profiles, for example in the form of a minimization of a weighted sum, of type:

$$par_i = \operatorname*{argmin}_{par}(k_1[M_{x_i,y_i} - M(par)]^2 + k_2[\varphi_{x_i,y_i} - \varphi(par)]^2) \quad (4)$$

where $k_1$ and $k_2$ are scalars, forming the weighting terms.

Preferably, the vector of parameters par of a particle comprises at least the refractive index. When the refractive index is expressed in the form of a complex quantity, the parameters comprise the real part Re(n) of the refractive index and its imaginary part Im(n). As indicated above, the parameters may comprise a dimension (diameter or radius) or a distance z of the particle with respect to the detection plane, along the propagation axis Z.

Step 150 requires recourse to be made to modelled profiles F(par), for various values of the vector of parameters par. As described with reference to FIG. 2D to 2F, or 3D to 3F, such profiles may be obtained by numerical modelling, in particular using the Mie-scattering model.

When the algorithm is based on a database of profiles, forming the latter is the objective of steps 90 and 95. In a step 90, the parameters that it is desired to determine are taken into account, these parameters forming a set of parameters, possibly taking the form of a vector of parameters. In a step 95, various particles are modelled using various values of the vector of parameters par so as to obtain, for each value of the vector of parameters par, a modelled profile F(par). Step 95 may also comprise an interpolation between modelled profiles F(par), F(par'), where par' is a vector of parameters the values of which are close to the vector par. The interpolation allows profiles corresponding to parameters comprised between par and par' to be obtained.

According to another embodiment, illustrated in FIG. 4B, it is possible to apply, in step 150, an iterative algorithm allowing a profile F(par) closest to the measured profile $F_{x_i,y_i}$ to be estimated. In this embodiment, the vector of parameters par of the modelled particle is gradually adjusted such that the profile F(par) corresponding to the vector of parameters par tends toward the measured profile $F_{x_i,y_i}$. In each iteration q, a deviation $\varepsilon^q$ between the measured profile $F_{x_i,y_i}$ and a profile $F(par^q)$ is determined. The notation $par^q$ corresponds to the vector of parameters taken into account in iteration q. The deviation $\varepsilon^q$ may be a mean square deviation or a mean deviation between the measured profile $F_{x_i,y_i}$ and the profile $F(par^q)$. It is preferably a question of a scalar. The vector of parameters $par^{q+1}$ of the following iteration q+1 is determined so as to minimize the deviation $\varepsilon^{q+1}$ between the measured profile $F_{x_i,y_i}$ and the profile $F(par^{q+1})$ established using the vector of parameters $par^{q+1}$. Thus, each iteration q aims to estimate a vector of parameters q+1 allowing the deviation to be minimized. The method is reiterated until stoppage of the iterations, this stoppage corresponding to the obtainment of a convergence criterion or of a preset number of iterations.

The vector of parameters $par^{q+1}$ considered in the following iteration may be estimated using a gradient-descent algorithm, during which, in each iteration q, a gradient of the deviation $\nabla \varepsilon^q$ is determined, the latter corresponding to a variation in the deviation $\varepsilon^q$ as a function of one or more parameters, and preferably each parameter, of the vector of parameters $par^q$. The vector of parameters $par^{q+1}$ taken into account in the following iteration is determined depending on $\nabla \varepsilon^q$, so as to minimize the deviation $\varepsilon^{q+1}$.

Substeps 151, 152 and 153, respectively corresponding to the formation of the modelled profile $F(par^q)$ and to the computation of the deviation $\varepsilon^q$ and its gradient $\nabla \varepsilon^q$, so as to define the parameters $par^{q+1}$ to be taken into account in the following iteration, have been shown in FIG. 4B.

In the first iteration (q=1), the iterative algorithm is initialized with an initial vector of parameters $par^{q=1}$. The initial vector of parameters may be preset.

In one embodiment, the two embodiments described above are combined: a database of profiles is used and the vector of parameters $par_i$ that minimizes the comparison between the profiles of the database F(par) and the measured profile $F_{x_i,y_i}$ is determined. Next, the vector of parameters corresponding to the observed particle is gradually adjusted using an iterative adjusting algorithm, for example of gradient-descent type. The iterative adjusting algorithm is then initialized with the vector of parameters $par_i$. In other words, in this embodiment, steps 100 to 150 shown in FIG. 4A are implemented. The vector of parameters $par_i$, resulting from step 150 of FIG. 4A, forms the initial vector $par^{q=1}$ allowing step 150 of FIG. 4B to be implemented.

Figure 4C:
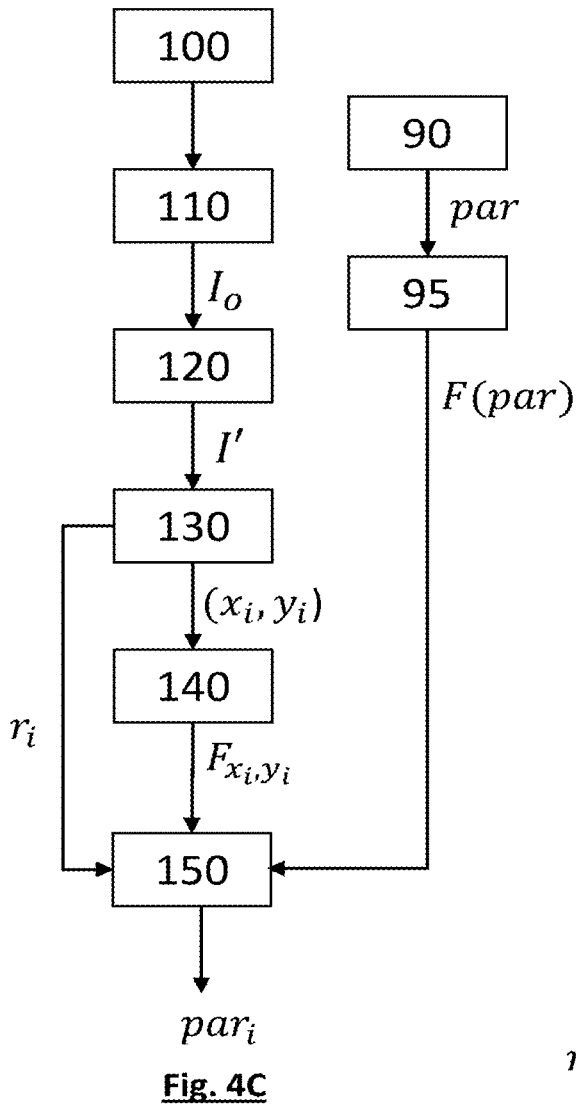

As a variant, the steps of which are shown in FIG. 4C, step 150 implements a minimizing algorithm, such as described with reference to FIG. 4A. Step 150 is initialized on the basis of an approximate value based on an estimation of one of the sought-after parameters. In the example shown in FIG. 4C, a dimension $r_i$ of a particle $10_i$ is taken into account, the dimension having been estimated using the observation image I' resulting from step 120. The fact of initializing the minimizing algorithm using an approximate value, based on an estimation of a parameter, allows computation time to be decreased and the precision of the determination of the vector of parameters to be improved. FIGS. 5A to 5C illustrate this aspect.

FIG. 5A shows an application of the invention to a floating cell $10_i$, of CHO type, bathing in a culture medium. The cell $10_i$ was illuminated with a light source 11 of 450 nm wavelength. The light source was a light-emitting diode emitting in the 450 nm-465 nm spectral band. It was placed at a distance of 1400 μm from a monochromatic image sensor (reference IDS 3840×2748 pixels). The sought-after parameters were par=$[r_i, \Delta n_i]$. An image $I_0$ of the cell was acquired, from which an observation image was obtained, by holographic reconstruction. The radius $r_i$ of the cell was estimated using the observation image, representing the modulus of the complex amplitude in the reconstruction plane. The observation image I' also allowed the coordinates $(x_i, y_i)$ of the center of the cell $10_i$ in the detection plane to be defined. From the acquired image, a profile $F_{x_i,y_i}$ of the modulus of the exposure light wave 14, along an axis parallel to the propagation axis Z and passing through the radial coordinates of the cell, was determined. The profile $F_{x_i,y_i}$ is called the measured profile.

Curve a shows a profile F (init) used for the initialization of the algorithm, the profile using the radius estimated with an observation image of the sample I'. The radius was estimated to be equal to 8.83 μm. This profile corresponds to the parameters $[r_i=8.15$ μm; $Re(\Delta n_i)=0.025]$. Curve b corresponds to the measured profile $F_{x_i,y_i}$. Curves c and d correspond to the closest modelled profile F*(par), without considering and while considering the imaginary part Im(n) of the refractive index n, respectively. The parameters $par_i$ associated with the curves c and d are respectively: $[r_i=8.15$ μm, $Re(\Delta n_i)=0.027]$ and $[r_i=8.15$ μm, $Re(\Delta n_i)=0.025$, $Im(\Delta n_i)=0.01]$. These parameters are considered to correspond to those of the examined cell.

FIG. 5B shows another example of application to another cell of the same type. In this example, from an observation image I', the radius $r_i$ of the cell was estimated to be 6.74 μm. The minimizing algorithm was initialized considering the modelled profile represented by curve a, the parameters associated with this profile being $[r_i=6.74$ μm, $Re(\Delta n_i)=0.01$, $Im(\Delta n_i)=0.00]$. Curve b corresponds to the measured profile $F_{x_i,y_i}$. Curve c corresponds to the closest modelled profile F*(par), the parameters associated with this profile being $[r_i=6.09$ μm, $Re(\Delta n_i)=0.014$, $Im(\Delta n_i)=0.007]$. These parameters are considered to correspond to those of the examined cell.

FIG. 5C completes FIG. 5B. In FIG. 5C, the measured profile $F_{x_i,y_i}$ (curve b) has been shown, the latter also being shown in FIG. 5B. In FIG. 5C, the profile a corresponds to the modelled profile with which the minimizing algorithm is initialized, the latter corresponding to the parameters $[r_i=6.68$ μm, $Re(\Delta n_i)=0.025$, $Im(\Delta n_i)=0.0]$. Curve c corresponds to the closest modelled profile, the parameters associated with this profile being [$r_i$=6.25 μm, Re($\Delta n_i$)=0.012, Im($\Delta n_i$)=0.008]. These parameters are considered to correspond to those of the examined cell. Although the minimizing algorithm is initialized considering different index values, it allows closest profiles F*(par) (profiles c of FIGS. 5B and 5C) to be obtained the respective parameters of which are consistent: [$r_i$=6.09 μm, Re($\Delta n_i$)=0.014, Im($\Delta n_i$)=0.007] for FIG. 5B and [$r_i$=6.25 μm, Re($\Delta n_i$)=0.012, Im($\Delta n_i$)= 0.008] in FIG. 5C.

Figure 4D:
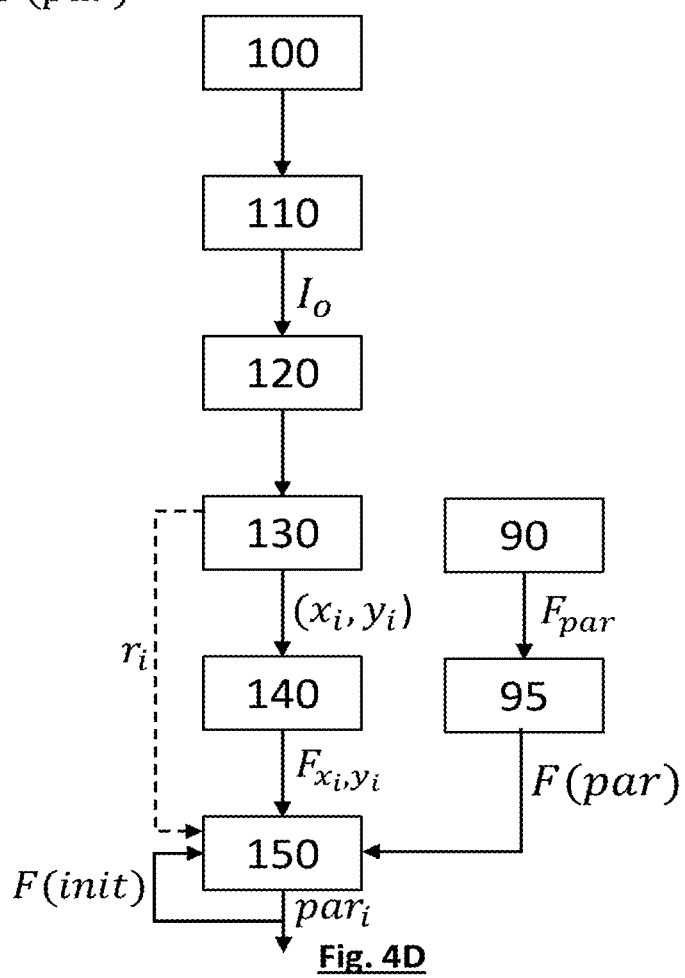

According to one embodiment, the steps of which are illustrated in FIG. 4D, step 150 of the algorithm is reiterated. Preferably, step 150 takes into account an estimation of the size of the particle resulting from an observation image. In a first iteration, step 150 results in a first estimation of the refractive index. This first estimation is used to define the initialization profile F (init) of the second iteration. The number of iterations may be higher than 2, but the inventors have observed that satisfactory results are obtained at the end of two iterations. FIGS. 6A and 6B show the quantification error respectively affecting the real part and the imaginary part of a refractive index without reiteration of step 150 (curves a) and with reiteration of step 150 (curves b). The errors have been shown as a function of the radius of the cells. These curves were obtained on the basis of models.

FIG. 7 shows an example allowing cells to be classified as a function of the imaginary part and of the real part of the refractive index. In this figure, the real part and the imaginary part of the refractive index of various cells have been shown, the shown values having been obtained by implementing the invention. It may be seen that comparison of the real part and the imaginary part is a relevant indicator relating to the state of the cell, among a living state or a dead state. A line separating two populations of cells depending on their respective states has been drawn.

FIG. 8 schematically shows a device allowing the invention to be implemented. Contrary to the device shown in FIG. 1, the device of FIG. 8 comprises an optical image-forming system 19. The optical system 19 defines an image plane and an object plane. The optical system may be a lens or an objective. During the acquisition of the image of the sample, the image sensor is placed in a defocused configuration. The detection plane is offset with respect to the image plane and/or the plane in which the sample lies is offset with respect to the object plane. The offset is generally small, preferably being smaller than 1 mm, and typically lying in a 50 μm-500 μm range.

The invention may be employed to characterize particles in the field of biology or health. Other applications may be envisioned, for example environmental inspection or industrial processes, or in the field of food processing.

The invention claimed is:

1. A method for determining parameters of a particle present in a sample, the sample lying between an image sensor and a light source, the image sensor lying in a detection plane, the method comprising:
    a) illuminating the sample with the light source, the light source emitting an incident light wave that propagates along a propagation axis;
    b) acquiring an image of the sample with the image sensor, the image sensor being exposed to an exposure light wave;
    c) determining a position of the particle in the detection plane or in a plane parallel to the detection plane;
    d) on the basis of the acquired image, applying a propagation operator, for a plurality of distances from the detection plane, so as to estimate, at each distance, a complex amplitude of the exposure light wave;
    e) on the basis of the complex amplitude estimated, at various distances, obtaining a profile representing a variation of the complex amplitude of the exposure light wave along an axis parallel to the propagation axis and passing through the position of the particle;
wherein the particle is associated with a set of parameters, comprising at least a size of the particle and a refractive index of the particle, the method also comprising:
    f) modelling a particle, taking into account a value of each parameter of the set of parameters, and modelling an exposure light wave, propagating toward the image sensor, under the effect of an illumination, with the light source, of the modelled particle;
    g) on the basis of the modelled exposure light wave, forming a profile representing a variation in the complex amplitude of the modelled exposure light wave, along an axis parallel to the propagation axis;
    h) comparing the profile obtained in e) with the modelled profile resulting from g), so as to determine the value of at least one parameter of the particle.

2. The method as claimed in claim 1, wherein the refractive index comprises a real part and an imaginary part.

3. The method as claimed in claim 1, wherein the set of parameters also comprises a distance of the particle with respect to the detection plane.

4. The method as claimed in claim 1, wherein:
    f) comprises modelling particles respectively having various values of at least one parameter, so as to obtain, following g), a database of modelled profiles, each modelled profile being associated with one set of parameters;
    h) comprises minimizing a deviation between the profile resulting from e) and the modelled profiles of the database, the respective values of the parameters of the particle being those minimizing the deviation.

5. The method as claimed in claim 1, wherein f), g) and h) are carried out iteratively, the value of a parameter of the particle resulting from one iteration being used to initialize a following iteration.

6. The method as claimed in claim 1, wherein:
    f) comprises modelling particles of various sizes and/or of various refractive indices, so as to obtain, following g), a database of modelled profiles, each modelled profile being associated with a size and/or a refractive index;
    h) comprises determining the size of the particle and/or the refractive index of the particle.

7. The method as claimed in claim 1, wherein:
    f) comprises modelling particles located at various distances from the detection plane, so as to obtain, following g) a database of modelled profiles, each modelled profile being associated with a distance with respect to the detection plane;
    h) comprises determining the distance between the particle and the detection plane.

8. The method as claimed in claim 1, wherein steps f) to h) are implemented iteratively, such that, in each iteration, the profile modelled in g) gets gradually closer to the profile determined in e).

9. The method as claimed in claim 8, wherein step h) of an iteration comprises:
    determining a deviation between the profile modelled in g) of the same iteration, and the profile resulting from e);
    determining a gradient of the deviation as a function of at least one parameter of the set of parameters, so as to determine the values of the parameters of the particle modelled in f) of the following iteration.

10. The method as claimed in claim 1, also comprising:
applying a propagation operator to the acquired image, while considering a plurality of distances with respect to the detection plane, so as to obtain a stack of reconstructed images, each reconstructed image being associated with a distance with respect to the detection plane;
on the basis of a reconstructed image, estimating a size of the particle;
such that h) comprises taking into account the size of the particle estimated on the basis of the reconstructed image.

11. The method as claimed in claim 1, wherein the particle is a cell, the method comprising determining an alive or dead state of the cell depending on the refractive index.

12. The method as claimed in claim 11, wherein the refractive index comprises a real part and an imaginary part, the alive or dead state of the cell being defined depending on a comparison between the real part and the imaginary part.

13. The method as claimed in claim 1, wherein there is no image-forming optic between the sample and the image sensor.

14. The method as claimed in claim 1, wherein an optical system lies between the sample and the image sensor, the optical system defining an image plane and an object plane, and wherein, in b), the image is acquired in a defocused configuration, the detection plane being offset with respect to the image plane, and/or a plane of the sample, in which the sample lies, being offset with respect to the object plane.

15. A device for observing a sample, the sample comprising particles, the device comprising:
a light source, configured to illuminate the sample;
a sample holder, configured to receive the sample;
an image sensor, placed such that when the sample is placed on the holder, it lies between the image sensor and the light source, the image sensor being configured to acquire an image of the sample;
a processor, configured to implement steps d) to h) of a method as claimed in claim 1, on the basis of an image acquired by the image sensor.

16. The device as claimed in claim 15, wherein no image-forming optic is placed between the image sensor and the processor.

17. The device as claimed in claim 15, comprising an optical system lying between the sample and the image sensor, the optical system defining an image plane and an object plane, the device comprising a means for adjusting the optical system, or the sample, or the image sensor, such that:
the detection plane is offset from the image plane;
and/or the object plane is offset from a plane of the sample, in which the sample lies.

\* \* \* \* \*